Nov. 8, 1966  F. X. MAYER ETAL  3,283,413
REACTION VESSEL WITH A GRID
Filed July 22, 1963  2 Sheets-Sheet 1
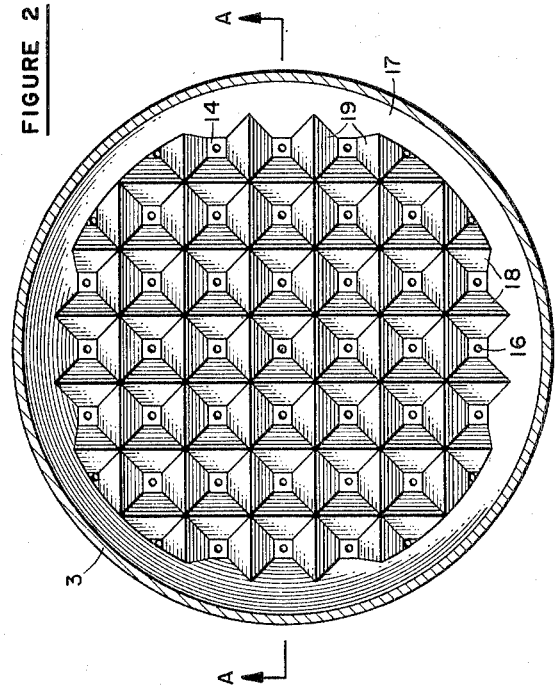
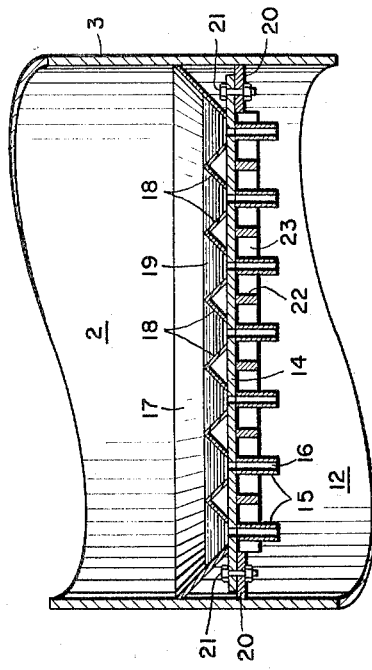
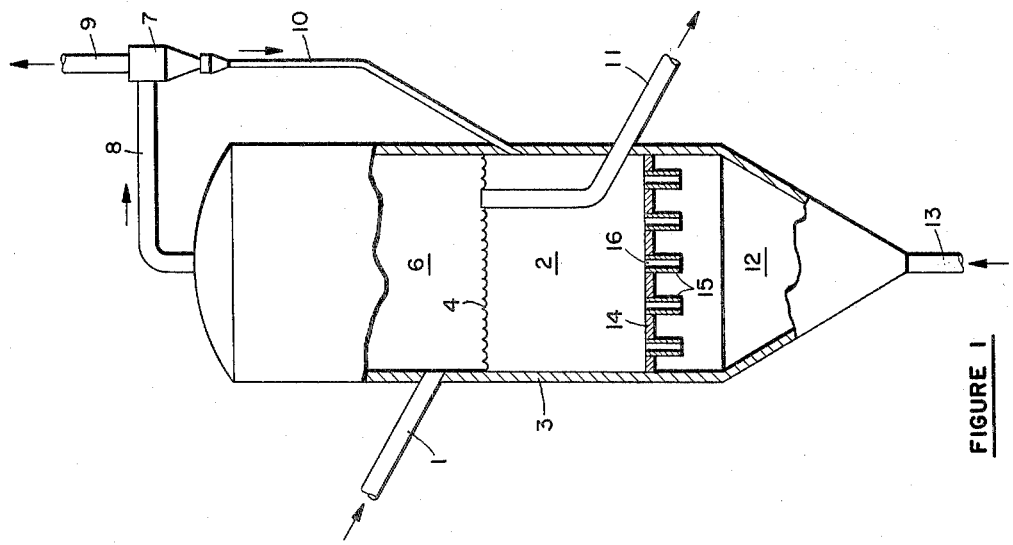
FRANCIS XAVIER MAYER
IVAN MAYER  Inventors
By Perry Carvellas
Patent Attorney Nov. 8, 1966    F. X. MAYER ETAL    3,283,413
REACTION VESSEL WITH A GRID
Filed July 22, 1963    2 Sheets-Sheet 2

Francis Xavier Mayer
Ivan Mayer    INVENTORS

BY Perry Carvellas
PATENT ATTORNEY

United States Patent Office 3,283,413
Patented Nov. 8, 1966

3,283,413
REACTION VESSEL WITH A GRID
Francis Xavier Mayer, Baton Rouge, La., and Ivan Mayer, Summit, N.J., assignors to Esso Research and Engineering Company, a corporation of Delaware
Filed July 22, 1963, Ser. No. 296,529
6 Claims. (Cl. 34—57)

This invention relates to an apparatus for obtaining a fluidized bed of finely divided solids in which apparatus the finely divided solids form a bed which is maintained in constant motion by the upward flow of fluidizing gas through the bed. More particularly, this invention relates to a novel fluidizing grid made up of a plurality of jet nozzles to fluidize finely divided solids. This invention relates to a novel apparatus for jetting fluidizing gas into a bed of finely divided solids through jet nozzles attached to a plate.

The jet nozzles of this invention have a cylindrical bore, i.e., a straight run section. The straight run section of the nozzles has a critical length to diameter ratio. The velocity at which the fluidizing gas passes through the straight run section is critical. By proper selection of the ratio of the length of the straight run section of the jet nozzle to the diameter and by careful control of the fluidizing gas velocity through the nozzle efficient fluid bed operation can be obtained as well as the prevention of back flow of the solids through the nozzles making up the grid.

A fluidized bed of finely divided solids can be obtained by placing the finely divided solids on a perforated plate in a suitable chamber, having the solids supported on the perforated plate, and below the perforated plate having a plenum chamber, and passing gas into the plenum chamber up through the perforations in the plate into the bed thereby fluidizing the solids in the beds. Due to the physical characteristics of the finely divided solids and the unevenness of the flow of gases through the perforations in the plate supporting the solids, the solids tend to back flow into the holes in the plate and cause plugging and defluidization of the bed. Frequently, the solids will even pass down into the plenum chamber and be picked up by the fluidizing gas and blown back through the perforations in the supporting plate causing more rapid plugging of the holes in the plate.

High gas velocity is generally relied on to keep the solid particles from passing downwardly through the openings or perforations in the grid. Even when high fluidizing gas velocities are utilized, it is found that where simple orifice openings in a plate grid are used in the grid, that the finely divided solids back flow through the orifice openings into the plenum chamber and cause plugging of the grid. For example, grid plates of about 1 inch in thickness having openings ¼ to ½ inch in diameter plug under conditions of fluid bed operations due to back flow of solids.

One of the problems in the development of an efficient fluid bed iron ore reduction process is the difficulty in obtaining fluidizing grids which function at high temperatures and will fluidize iron ore at a high state of metallization in the ferrous bed of the iron ore reduction operation. Fluid beds of iron ore at high states of metallization and at temperatures of 1400–1600° F. tend to sinter and agglomerate. Plugging of the grid is particularly a problem if the finely divided, substantailly reduced iron particles under these conditions are allowed to back flow into an orifice opening in the ferrous zone fluidizing grid. This has caused defluidization of the bed and failure of the ferrous grid.

Attempts have been made to adapt mechanical means for preventing back flow of solids into the orifice openings of the grid plate, for example, bubble caps have been inserted over the orifice openings of the grid plate. These bubble caps, however, have proved unsatisfactory in that solids get under the end of the caps, agglomerate, and plug the bubble cap openings at the high temperatures used. Attempts have been made to use orifice openings or nozzles having a ratio of length to inside diameters of 2/1. However, these have failed to operate efficiently due to back flow of solids into the nozzles.

In order to obtain a high degree of efficiency of gas solids mixing and to prevent back flow of solids, it is desirable to inject the fluidizing gas into the finely divided solids at reasonable gas velocities. Heretofore, fluidizing the solids by passing the fluidizing gas into the finely divided solids through simple orifice openings even at high velocities resulted in a solids back flow and plugging of the openings and inefficient gas solids mixing. Appilcants have unexpectedly found that if the fluidizing gas is introduced through a jet nozzle having a critical length to diameter ratio that lower gas velocities could be used and that back flow of solids could be prevented and that more efficient gas solids contacting could be obtained.

The present invention relates to a fluidized bed apparatus comprising a vertically disposed, cylindrical vessel in which a fluidized bed of finely divided solids is contained, a supporting plate in the vessel on which the finely divided solids are supported, the supporting plate having orifice openings and a plurality of jet nozzles the upper end of which is coterminous with the upper surface of the orifice openings in the plate. The jet nozzles have a cylindrical bore and the length of the cylindrical bore is at least 5 times the inside diameter of the jet nozzles. Passage of the fluidizing gas at critical gas velocities through a multiplicity of the evenly spaced jet nozzles fluidizes the finely divided solids in the bed.

Any finely divided solids which can be fluidized can be treated in accordance with the present invention. The fluidizing gases may be inert gases, air, reducing gases, or any gas which it is desired to chemically or catalytically react with the finely divded fluidized solids. The solids can react themselves, or can be catalysts which undergo substantially no reaction in the fluid bed. The temperature at which the novel grid is used in obtaining a fluid bed is important though not critical and would be any temperature suitable for carrying out the desirable fluid bed operation. The pressure at which the grid is operated is important though not critical and may be any pressure at which the fluid bed operation is carried out.

Fluidized bed reactions are, per se, well known. In a fluid bed operation the gas velocity needed to obtain a fluid bed is related to the particle size and density of the finely divided particles in the bed, and to the density of the fluidizing gas. The gas velocity is controlled so as to maintain the finely divided solids in a dense, turbulent state simulating a boiling liquid. In the fluidized bed, the finely divided solids undergo intensive vertical and horizontal motion on the passage of the fluidizing gas through the bed and the solids assume a pseudo liquid level.

Applicants have unexpectedly found that the length/diameter ratio of the jet nozzles through which the fluidizing gas is introduced into the fluid bed to prevent solids back flow is critical and closely related to the velocity of the fluidizing gas. Applicants found that lower fluidizing gas velocities, through the nozzles, may be used and solids back flow prevented when the fluidizing grid consists of a plurality of evenly spaced jet nozzles which have a critical ratio of length of the cylindrical bore of the jet nozzle to the inside diameter of the bore of more than about 5 and preferably more than 10. This type of grid prevents back flow of finely divided solids through the jet nozzles into the plenum chamber beneath the grid. This operation is conveniently and efficiently carried out without the necessity of mechanical difficult-to-maintain bubble caps over the openings in the jet nozzles in the grid. Though some finely divided solids may pass down into the jet nozzles a short distance if there are pressure fluctuations in the bed, the ratio of the length of the straight run portion of the nozzle to its diameter, and the velocity of fluidizing gases are selected so that the length is more than long enough and the pressure drop across the jet nozzle is more than sufficient to prevent the passage of the finely divided solids through the nozzle for the short period of pressure fluctuation. As soon as the pressure in the bed stabilizes, the solids will be quickly pushed up out of the nozzle and plugging of the nozzle and passage of the solids completely through the nozzle is prevented.

The apparatus of the invention and the manner in which the apparatus is used are described in detail in the drawings.

FIGURE 1 of the drawings is a schematic representation of a fluid bed operation wherein finely divided solids are fluidized utilizing the apparatus and process of the present invention.

FIGURE 2 of the drawings is a detailed illustration of an embodiment of the novel apparatus of the fluid grid looking at the grid from the top.

FIGURE 3 of the drawings is a vertical cross-section taken through line A—A of FIGURE 2 showing the fluidizing grid jet nozzles and detailed construction of the grid.

Figure 5:
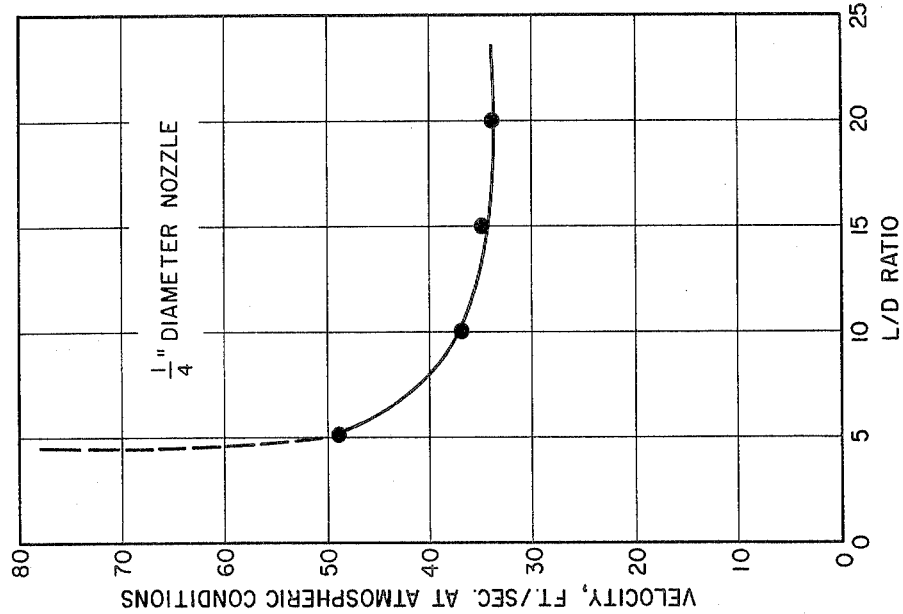
FIGURE 5 is a diagram illustrating the critical relationship of length and diameter of a ¼" diameter jet nozzle as related to fluid gas velocity.

The present invention is concerned specifically with a novel fluidizing grid apparatus arranged so that the apparatus can be used for obtaining a fluidized bed of solids. The invention is also related to structure for obtaining more efficient gas-solids contacting and utilization of fluidizing gases.

The conditions of gas velocity, gas density, and size and density of solids at which fluid beds are operated will depend upon the particular operation carried out. Various modifications to the grid, which will be obvious to those in the art, are intended to be included in the present design. The critical feature of the present design, however, is the ratio of the length of the straight run portion, the cylindrical bore, of the jet nozzle to the inside diameter of the bore. Within specific length/diameter ratios, specific minimum fluidizing gas velocities will preferably be used to prevent back flow of solids. However, depending on the density of the fluidizing gas and the density and size of finely divided solids, the fluidizing gas velocity can be varied within limits.

The inside diameter of the jet nozzle may be 0.02 to 2 inches, more generally 0.1 to 1.0 inch, and preferably for treating most solids 0.2 to 0.75 inch in diameter. The corresponding lengths of the straight run portion of the jet nozzle will be 5–40 times the diameter, more generally 10–30 times the diameter, and preferably in the range of 10–20 times the diameter. These ratios are critical and ratios of less than about 5 times the length of the jet nozzle result in back flow of solids through the jet nozzle and plugging of the jet nozzle, whereas ratios above about 40 times the diameter result in relatively high pressure drops of the fluidizing gas in passing through the straight run portion of the nozzle and require excessively high pressure in the fluidizing gas in order to pass through the nozzle. Fluidizing gas velocities through the nozzle, at equivalent atmospheric temperature and pressure for air, for the length and diameter of the jet nozzles described will be a minimum of 10 to 300 ft./sec. and usually 20 to 200 ft./sec., and specifically between about 25–150 ft./sec. For nozzles with length/diameter ratios of 5 to 10 the minimum gas velocity through the nozzle will be about 100–200 ft./sec./inch in diameter or fraction of an inch of diameter of the jet nozzle used at equivalent atmospheric temperature and pressure for air. For example, at elevated temperatures at which the density of the gas is less the velocities can be increased and at lower temperatures where the density is greater the velocity can be decreased. Changes in pressure have a similar effect. The gas velocity through the nozzle will vary with the gas, temperature, and pressure at which the fluid bed is operated at a specific length/diameter ratio. The ratio of the area of the jet nozzles to the total area of the grid plate will depend on the particular operation carried out and volume of gas and superficial gas velocity through the bed it is desired to maintain.

By following the teachings of the present invention, the determination of the specific fluidizing gas velocities needed with specific length/diameter ratios and for specific processes can be determined by those skilled in the art and can be arrived at easily. Solids fluidized in accordance with the present invention are those which can be easily fluidized at reasonable fluidizing gas velocities. Generally, particles of the size of 0.5 inch to about 10 microns are fluidized, more generally about 0.2 inch to about 10 microns, and specifically about 2000 to 40 microns. Solids are normally treated in a suitable grinding device or milling device to obtain solids which can be easily fluidized. For example, finely divided iron ore suitable for fluidization will have a particle size range between about 4 mesh and about 425 mesh.

In accordance with a preferred embodiment of the present invention, finely divided particles of partially reduced iron ore are reduced to 85 to 98% metallic iron in a fluid bed operation by contact with a reducing gas. This technique is described with reference to FIGURE 1 of the drawings. In FIGURE 1 of the drawings, the apparatus illustrated comprises a vertically disposed cylindrical vessel 3 which is divided by a supporting plate 14 into an upper chamber 6 and a lower chamber 12. Supporting plate 14 contains jet orifices 16 through which the fluidizing gas from chamber 12 passes into fluid bed 2 in upper chamber 6. The openings 16 are distributed uniformly over the whole area of plate 14. Finely divided, partially reduced iron ore, primarily in the state of FeO, but containing some Fe, is fed into upper chamber 6 through line 1 forming a fluid bed of finely divided particles 2 which have a level 4. Fluidizing gases passing upwardly through supporting plate 14 and orifice openings 16 fluidize the finely divided ore in the bed, and as the bed height increases it overflows into downcomer 11 and is removed from vessel 3. Due to the fluidized conditions of the bed, as a result of which it acts in many respects like a boiling liquid, the height of the fluid bed 4 is determined by the height of the uppermost extension of downcomer 11.

Reducing gas from a suitable source comprising carbon monoxide and/or hydrogen is introduced through line 13 through fluidizing grid plate 14 whereby the gas fluidizes the finely divided iron ore in bed 2. The necessary heat to carry out the endothermic reduction reaction where a mixture of CO and $H_2$ is used can be supplied by conventional means, for example, by preheating the iron ore and/or reducing gas. The FeO is reduced by countercurrent contact with the reducing gas to 85–95% metallic iron which is removed from vessel 3 by downcomer 11. The temperature in vessel 3 is maintained at about 1000–1600° F., depending on the composition of the reducing gas, and the pressure at 5–60 p.s.i.g. by conventional means. The fluidizing gas in bed 2 entrains the very fine particles, carrying them into chamber 6 wherein they are withdrawn through line 8 and fed to cyclone separator 7 where the fines are separated from the gas and returned to bed 2 through line 10. The solids-free gas is removed from cyclone 7 through line 9. The fluidizing gas velocity through bed 2 is maintained at about 2.5 to 5 ft./sec. and an average residence time for the solids in bed 5 is 8–24 hrs. The bed diameter can be 2–30 feet, and the bed height 9–36 feet.

The critical feature of this fluid bed iron ore reduction apparatus is in construction and operation of the grid. Plate 14 contains orifice openings 16. Orifice openings 16 are formed by the cylindrical bore in the jet nozzles 15. The jet nozzles 15 are connected to plate 14. This is merely a schematic drawing and in actual operation the nozzles will be smaller and more closely spaced. The straight run portion of jet nozzle 15, i.e., the cylindrical bore, has a critical length in relationship to the inside diameter of jet nozzle 15. For diameters of 0.1 to 0.3 inch, the length of the jet nozzles would be 10–30 times the diameter and the corresponding fluidizing gas velocities through the nozzle would be 30–100 ft./sec. at equivalent atmospheric conditions, that is, the fluidizing gas velocity through the jet nozzle and not the over-all gas velocity through the fluid bed. In reducing iron ore in the form of finely divided solids and at high average metallization of the bed undergoing reduction, the temperature and fluidizing conditions become extremely critical. In fluidizing bed grids having simple orifice openings of about ½ inch diameter or less, at temperatures of 1200–1600° F., any substantial back flow of solids into the jet nozzles tends to cause plugging of the grid. Even more serious, back flow of the finely divided iron solids into chamber 12, followed by passage of the hot solids back through the nozzles with the gas, further aggravates the plugging problems in the grid and results in defluidization of the bed and failure of the grid.

FIGURE 2 is a detailed drawing of a preferred embodiment for carrying out a fluid bed operation. The fluidization grid of FIGURE 1 had a flat upper surface. For applications where the prevention of the collection of a small amount of solids on the top surface of the fluid bed between orifice openings in the plate grid is important, the design of FIGURE 2 is more efficient for carrying out the operation. Though the design of FIGURE 1 was discussed in relation with iron ore reduction, it is preferred to use the design of FIGURE 2 and FIGURE 3 for iron ore reduction. FIGURE 2 is a top view drawing of a grid which contains diverging discharge means for the gases coming from the jet nozzles which prevent solids stagnation between jet nozzle openings in the grid plate. FIGURE 3 is a cross-sectional drawing through line A—A of FIGURE 2. The diverging discharge conduits are made up by members 18 and 19 which members are each inclined to the horizontal at the opening at about 30 to 80°, preferably 30 to 60°, more preferably about 45°, forming an inverted pyramidal type chamber directing falling solids toward the orifice openings in the grid plate. The diverging gas discharge means direct the falling solids toward an orifice opening in the grid plate, preventing any dead space or stagnation of solids on the grid between orifice openings. From FIGURE 2 it can be seen that the orifice openings in the grid plate are evenly spaced throughout the area of the grid plate. The cross-sectional drawing of FIGURE 3 shows the means by which the grid plate is supported in chamber or vessel 3. The grid plate 14 is supported on member 20 and is connected to member 20 by bolts 21. Member 17 is peripherally spaced in vessel 3 and is inclined downward from the horizontal thereby directing solids toward the center of the vessel. Because of the heavy weight of the iron ore bed in the vessel, fluidizing grid plate 17 is further supported by traverse supporting members 23 and longitudinal supporting members 22.

Grid 14 can be of any thickness and diameter required to carry out the particular operation and support the fluid bed. Generally grid plate 14 would be about ½ to 2 inches in thickness and would be bolted or welded to reactor vessel 3. An assembly of ridges made by members 18 and 19 is connected by suitable means, e.g., welding to the top of grid plate 14 which ridges slope to the holes and prevent the accumulation of particles between holes and sides of the vessel.

By using properly sized jet nozzles with a critical length/diameter instead of simple orifices in the grid plate and by introducing the fluidizing gas at the proper velocity, the fluidized finely divided solids are prevented from flowing substantially into and/or through the jet nozzles and plugging of the nozzles is prevented. The jet nozzles of this invention are preferably constructed of a metal alloy such as stainless steel. It is preferred that these nozzles be welded in place on the bottom of grid plate or made to penetrate the grid plate and welded or screwed in place. Either method of construction would be satisfactory and would depend upon the easiest mechanical means of attaching the jet nozzles to the flat grid plate. The straight run portion of the nozzle can be made by conventional means of drilling out the nozzles.

The invention is further illustrated by the following examples.

*Example 1*

A fluid bed was obtained by filling a vessel about one foot in diameter to a height of about eight to ten feet with finely divided solids having a particle range of 30 to about 1000 microns. The solids were supported on a fluidizing grid of the type described in FIGURE 2 of the drawings. The openings of the evenly spaced jet nozzles covering the surface of the flat plate grid had an inside diameter of 0.3 inch. The length of the straight run portion of the jet nozzles was twenty times the inside diameter of the nozzle, and was six inches. While filling the vessel with solids, fluidizing gas at 50 ft./sec. (air at about 80° F. and atomspheric pressure) was introduced through the jet nozzles and fluidized the solids as they were introduced into the bed. The solids were gradually added to the vessel while maintaining the passage of gas through the grid so that there would be no initial back flow of solids through the nozzles to cause plugging. It was found that there was no back flow of solids into the plenum chamber and no plugging of the grid. The bed was operated for 8–10 hours without difficulty.

In order to show the efficiency of the grid at elevated temperatures, a grid containing the same size nozzles was operated in a fluid bed of finely divided FeO and Fe solids at 1400° F. and 15 p.s.i.g. for more than two months at a mass gas velocity through the nozzles equivalent to 50 ft./sec. air at atmospheric temperature and pressure. The actual gas velocity was about 720 ft./sec.

*Example 2*

In order to show the critical relationship of length and diameter of the jet nozzles as related to fluid gas velocity in fluidizing finely divided solids, several runs were carried out whereby the length to diameter ratio of the jet nozzles was varied to determine at what length to diameter ratio and at what gas velocity a back flow of solids through the jet nozzle would occur. The information obtained is recorded below in Table I.

TABLE I

| Diameter of Orifice, Inches | Length/Diameter Nozzle Length Orifice Diameter | Velocity at Solids Run Back Ft./Sec. |
|---|---|---|
| ¼ | 20 | 34 |
| ¼ | 15 | 35 |
| ¼ | 10 | 37 |
| ¼ | 5 | 49 |
| ⅜ | 20 | 25 |
| ⅜ | 15 | 26 |
| ⅜ | 10 | 27 |
| ⅜ | 5 | 72 |

To obtain these data, solids of about minus 4 mesh with fluidized in a bed into which the fluidizing gas (air) was introduced through jet nozzles having the indicated diameters and length/diameter ratios.

The beds were fluidized by introduction of gas through a nozzle of given length/diameter ratio. The gas velocity was gradually decreased until solids back flow completely through the nozzle occurred. The runs were carried out at atmospheric temperature and pressure. The gas velocity at which solids back flow occurred was recorded in each case.

The fluidizing gas velocity required to prevent back flow of solids will have to be adjusted in accordance with known gas density relationships to obtain an equivalent mass velocity needed to prevent back flow of solids with a specific gas at a specific set of operating conditions of temperature and pressure.

Figure 4:
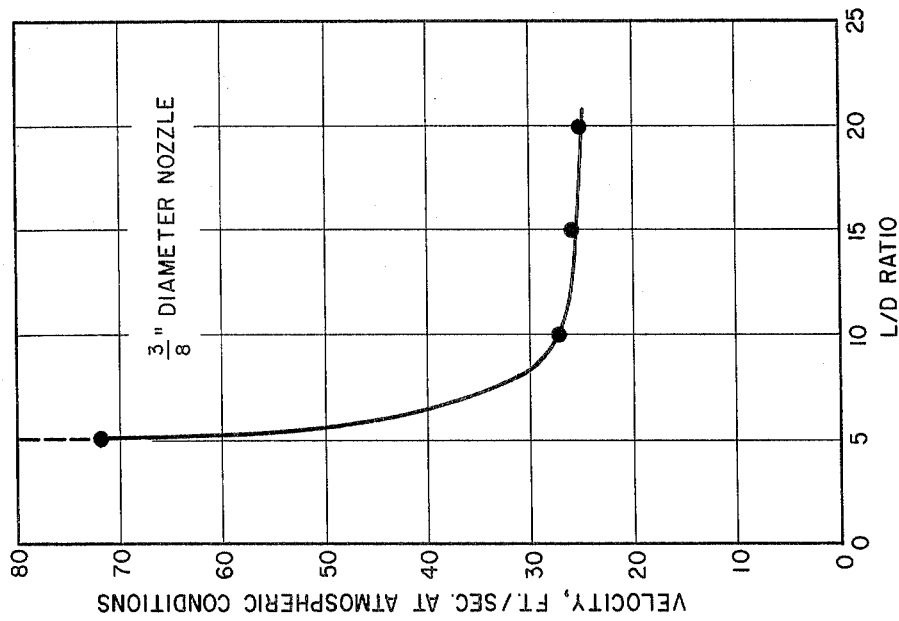
FIGURE 4 is a diagram illustrating the critical relationship of length and diameter of a ⅜" diameter jet nozzle as related to fluid gas velocity.

FIGURES 4 and 5 of the drawings clearly show that back flow of solids at length/diameter ratios of less than 5 cannot be prevented at reasonable gas velocities. The data show that in order to prevent back flow that a minimum length/diameter of 5 must be used. The data also clearly show that by increasing the length/diameter from about 5 to 10 that a substantial decrease in gas velocity can be realized while still preventing solids back flow. It was unexpectedly found that at length/diameter of 10 and greater that solids back flow was prevented at about the same minimum gas velocity.

The use of applicant's novel fluid grid is not limited to iron ore reduction, but can be used in any system where a fluid bed operation is carried out and where it is desirable to prevent back flow of solids into the fluidizing grid orifices and plenum chamber and to prevent plugging of the grid. This apparatus can be used in direct iron ore reduction, fluid bed roasting of iron sulfides, fluid catalytic cracking, fluid bed calcining of coke, and the like operations. Obviously, many other modifications and variations in the invention as heretofore set forth may be made without departing from the scope and spirit thereof. Therefore, only such limitations should be imposed as are indicated by the appended claims.

What is claimed is:

1. In a reaction vessel having a grid mounted across an enclosing wall, the wall defining a passageway for a high velocity ascending gas which passes through the grid and into contact with a finely divided solids material to form a fluidized solids bed, said grid being constituted of a flat plate having evenly spaced orifice openings and, attached to the bottom of said plate at the orifice openings, jet nozzles each having a cylindrical bore therethrough, the bore of each jet nozzle communicating with an orifice opening and each being provided with a straight run portion the length of which ranges from about 10 to about 40 times the inside diameter of said cylindrical bore, the improvement comprising an assembly of ridges integral with said flat grid plate, each being inclined to the horizontal of an opening at from about 30° to about 80° and forming around each of said orifice openings inverted pyramidal shaped areas each sloping downwardly into an orifice opening.

2. The apparatus of claim 1 wherein the ratio of the length of the straight run portion of the cylindrical bore to the inside diameter of said cylindrical bore ranges from about 10 to about 30.

3. The apparatus of claim 1 wherein the inside diameter of said cylindrical bore ranges from about 0.02 to about 2 inches.

4. The apparatus of claim 1 wherein the inside diameter of a cylindrical bore ranges from about 0.1 to about 1 inch, and the straight run portion of the cylindrical bore ranges from about 10 to about 20 times the inside diameter of said cylindrical bore.

5. The apparatus of claim 1 wherein the said ridges are inclined to the horizontal at the opening at from about 30° to about 60°.

6. The apparatus of claim 5 wherein the said ridges are inclined to the horizontal at the opening at about 45°.

References Cited by the Examiner

UNITED STATES PATENTS

| | | | |
|---|---|---|---|
| 2,357,901 | 9/1944 | Lewis et al. | 34—57 |
| 2,850,808 | 9/1958 | Jones et al. | 34—57 |
| 3,016,624 | 1/1962 | Bliss | 34—57 |

FREDERICK L. MATTESON, JR., *Primary Examiner.*

JOHN J. CAMBY, *Examiner.*